United States Patent
Sahara

[15] 3,683,767
[45] Aug. 15, 1972

[54] ELECTRONIC SHUTTER SYSTEM

[72] Inventor: Masayoshi Sahara, Sakai, Japan

[73] Assignee: Minolta Camera Kabushiki Kaisha, Osaka Prefecture, Japan

[22] Filed: June 22, 1971

[21] Appl. No.: 155,413

[30] Foreign Application Priority Data

June 22, 1970  Japan......................45/54650

[52] U.S. Cl..............................95/10 CT, 95/53 EB
[51] Int. Cl................................................G03b 9/62
[58] Field of Search...............95/10 CT, 53 EB, 53.3

[56] References Cited

UNITED STATES PATENTS 3,500,729   3/1970   Rentschler et al.......95/10 CT

*Primary Examiner*—Samuel S. Matthews
*Assistant Examiner*—Russell E. Adams, Jr.
*Attorney*—Craig and Antonelli

[57] ABSTRACT

An electronic shutter system is comprised of a photoelectric exposure timer and includes an adjustable timer circuit. The exposure timer triggers the adjustable timer which adds an additional amount of exposure time before shutter closure to compensate for delay in shutter opening do to shutter blade overlap.

32 Claims, 5 Drawing Figures

INVENTOR
MASAYOSHI SAHARA

BY Craig, Antonelli & Hill

ATTORNEYS

ELECTRONIC SHUTTER SYSTEM

BACKGROUND OF THE INVENTION

The present invention relates to an electronic shutter circuit capable of adjusting the errors in the exposure, which are caused by the difference between the exposure time determined by an electrical exposure measuring circuit and the desired exposure of the film.

Generally, in a shutter which gives an exposure to the film by the movement of two light-shielding members, that move in the same direction with a time lag proportional to the desired exposure time, such as a two-curtain focal plane shutter or rotary-mirror shutter, said two light-shielding members are partially overlapped each other during the shutter charging, as well as, prior to the start of operation, so as mainly to prevent light coming through these two members. Therefore, the starting positions of these two light-shielding members are different, and the following light-shielding member (hereinafter referred to as "following member") must be started after starting of the first light-shielding member (hereinafter referred to as "leading member") to allow a time difference for the desired exposure time plus the time required for release the overlapping of the two members.

For example, in the case of a two-curtain focal plane shutter, the movement of the shutter curtains can be plotted as shown in FIG. 1. In FIG. 1, the abscissa indicates the time elapsed $t$, taking the starting position of the leading curtain as its starting point, and the ordinate indicates the distance of movement of the shutter curtains, taking the starting position of the end of the leading curtain as its starting point 0. Since the end of the leading curtain and the top of the following curtain are overlapped prior to the start of a focal plane shutter, the starting position of the top of the following curtain is indicated at the position $S_2$ against the starting position of the end of the leading curtain $S_1$, and the distance between the positions $a_1$ and $a_2$ becomes the opening for exposuring film, i.e., exposure aperture. The curve 1 shows the movement of the end of the leading curtain and the curves 2, 3, 4, and 5 show the movements of the top of the following curtain corresponding to various exposure times, and $t_2$, $t_3$, $t_4$ and $t_5$ show the time between the start of the leading curtain and that of the following curtain.

Generally, in such a two-curtain focal plane shutter, each shutter curtain is accelerated until the end of the leading curtain or the top of the following curtain reaches the exposure aperture, and each shutter curtain shows nearly parallel movement curves while passing across the exposure aperture, and the distance between the curves in the direction of the axis of the abscissas (for example, $te_2$ and $te_3$) becomes the actual exposure time. Therefore, if the following curtain starts moving right after the start of the leading curtain at the point $t_1$, the movement curve of the top of the following curtain coincides with the movement curve of the end of the leading curtain at the exposure aperture; in other words, if the difference in the starts of the two curtains is smaller than $t_1$, the film in the camera is not exposed at all.

Thus, the film exposure time T and the time difference $t_s$ which exists between the starts of the two shutter curtains have the following relationship:

$$T = t_s - t_1,$$

wherein $t_1$ is dependent of the degree of the overlapping of the two shutter curtains and their movement characteristics and is a constant particular to individual shutter. Normally, the value of $t_1$ is around 4/1,000 to 5/1,000 second which is about 4 to 5 times as long as the shortest exposure time of 1/1,000 second common to normal focal plane shutters. In other words, the time difference $t_s$ between the starts of the respective shutter curtains shall be equal to the exposure time T plus $t_1$ which is particular to individual shutter.

On the other hand, the conventional electronic shutter is constructed in such a way that the exposure time is measured at the start of the shutter opening operation, and the shutter closing operation starts after the lapse of the proper exposure time. Accordingly, it is required to give some adjustment responding to the particular additional time (equaling $t_1$ in said example of a two-curtain focal plane shutter due to the overlapping of the light-shielding members, in order to apply the conventional electronic shutter circuit to the shutter consisting of a leading member and a following member as aforementioned. The conventional means for this adjustment proposed by the prior art is such that the exposure time measurement starts only when the end of the leading member moves to the position where the overlapping with the following member is released by mechanical means; however, such mechanical means make the construction of the shutter complicated and also the adjustment of the errors of the additional times particular to individual cameras become difficult, and said adjustment quantities also tend to bear variations (spread) among cameras. As a result, the adjustment of high accuracy becomes impossible and especially, considerable exposure error in high-speed picture taking tends to result.

Also, in conventional electronic shutter circuits, there are variations (spreads) among cameras as to the time from the start of the shutter opening operation to the opening of the count switch of the control circuit to start counting the exposure time obtained by the light exposure measuring circuit, as well as, the time from the generation of shutter closing signal in the controls circuit to the actual operation of the closing members of the shutter, which times are difficult to adjust.

SUMMARY OF THE INVENTION

An objective of the present invention is to provide an electronic shutter, which is free from the aforementioned disadvantages of conventional electronic shutters, and is capable of adjusting the additional times particular to individual shutters and errors of time in the interlocking system between the control circuit and the mechanical operating members, with high accuracy. To practice this objective, the present invention incorporates an additional timer circuit, to provide the required additional time to the exposure time control circuit, which comprises a control circuit for the controlling the time responding to the brightness of an photographic object, to the opening of the diaphragm of the picture-taking lens and to the film sensitivity, and an electromagnet for starting the closing operation of the shutter. By this circuit construction, the shutter closing operation starts after the lapse of a proper exposure time measured by said control circuit plus a time lag added by said timer circuit, wherein the additional time lag added by said timer circuit is made to be adjustable.

DETAILED DESCRIPTION

Figure 1:
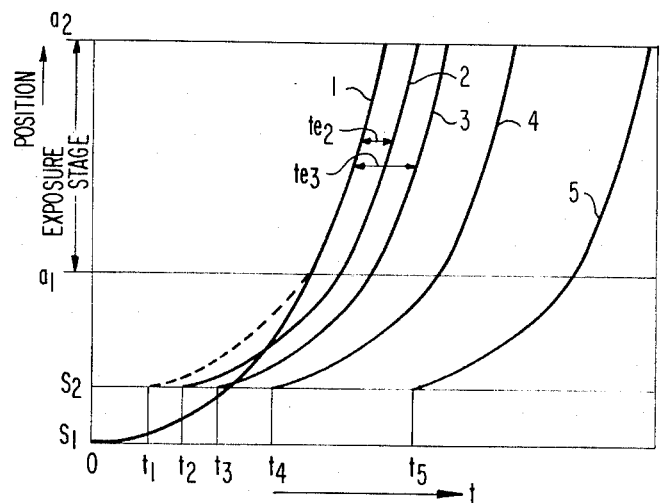
FIG. 1 is a graph indicating the movement of the shutter curtains in a focal plane shutter.
Figure 2:
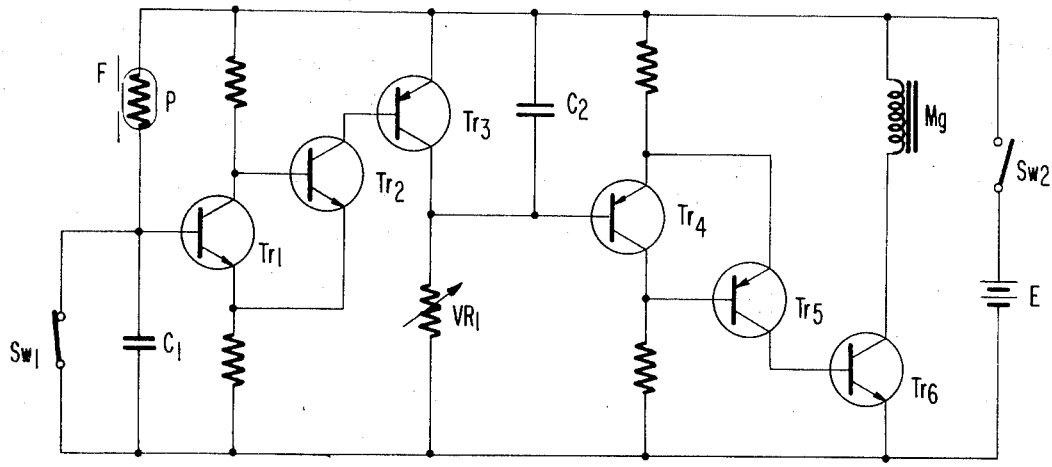
FIGS. 2 and 3 and 4 are schematic circuit diagrams of examples of electronic shutter circuit embodying the present invention, wherein the circuit elements for the same function are shown with common reference characters.

In FIG. 2, P is a photoconductive element, $C_1$ is a capacitor to constitute a first delay circuit together with said photoconductive element P, and $SW_1$ is a count-starting switch connected to constitute a short-circuiting path for the capacitor $C_1$ when closed. Transistors $Tr_1$ and $Tr_2$ form a switching circuit wherein one transistor becomes conductive as the other transistor becomes non-conductive, and the transistor $Tr_3$ is an amplifying transistor. A capacitor $C_2$ connected between the emitter and the collector of the transistor $Tr_3$ forms the second delay circuit together with a variable resistor or semi-fixed resistor $VR_1$ connected in the collector circuit of said transistor $Tr_3$. Transistors $Tr_4$ and $Tr_5$ constitute a second switching circuit which responds to the voltage across the variable resistor $VR_1$, and the transistor $Tr_6$ is an amplifying transistor. An electromagnet Mg is connected in the output circuit of the transistor $Tr_6$, which electromagnet Mg starts the closing operation of the shutter, by known means not shown in figure, when the switching circuit comprising the transistor $Tr_4$ and $Tr_5$ is reversed. E is a DC power supply, $SW_2$ is a power switch, and F is an optical filter to control the light incident on the photoconductive element P, depending on the lens diaphragm opening and the film sensitivity.

In such a circuit construction, when the power switch $SW_2$ is closed, the transistors $Tr_2$ and $Tr_3$ become conductive, since the transistor $Tr_1$ is in the non-conductive state, because the capacitor $C_1$ is short-circuited by the count starting switch $SW_1$. Therefore, the transistor $Tr_4$ becomes non-conductive and the transistors $Tr_5$ and $Tr_6$ become conductive, whereupon the electromagnet Mg is excited, because only a very low voltage between the emitter and the collector of the transistor $Tr_3$, which is in the conductive state, is applied across both ends of the capacitor $C_2$. This excited electromagnet holds holding members of the shutter closing mechanism, for example, the holding members of the following curtains in a two-curtain focal plane shutter, in their holding positions by known means. Subsequent to this, when the count switch $SW_1$ is opened, being interlocked with the start of the opening movement of the shutter, for example, the release of the landing curtain in a focal plane shutter and charging of the capacitor $C_1$ through the photoconductive element P starts and, when the capacitor $C_1$ is charged to a predetermined level after the lapse of a proper exposure time determined by the light resistance of the photoconductive element P and the electrostatic capacitance of the capacitor $C_1$, in other words, after the lapse of time equal to the desired exposure time, the transistor $Tr_1$ becomes conductive and the transistors $Tr_2$ and $Tr_3$ become non-conductive and the capacitor $C_2$ is charged through the variable resistor $VR_1$. Thus, the transistor $Tr_3$ works as a kind of short-circuiting switch for the capacitor $C_2$. After the lapse of time determined by the resistance of the variable resistor $VR_1$ and the electrostatic capacitance of the capacitor $C_2$, the capacitor $C_2$ is charged to the predetermined value, the switching circuit comprising the transistors $Tr_4$ and $Tr_5$ is reversed making the transistor $Tr_3$ non-conductive, and electric current to the electromagnet Mg is cut off. Accordingly, the holding of said shutter holding members is released and the shutter closing operation takes place. Moreover, the value of the variable resistor $VR_1$ can be pre-set appropriately to respond to the additional time particular to the individual camera. This additional time can be set as a value including the adjustment required against error.

Figure 3:
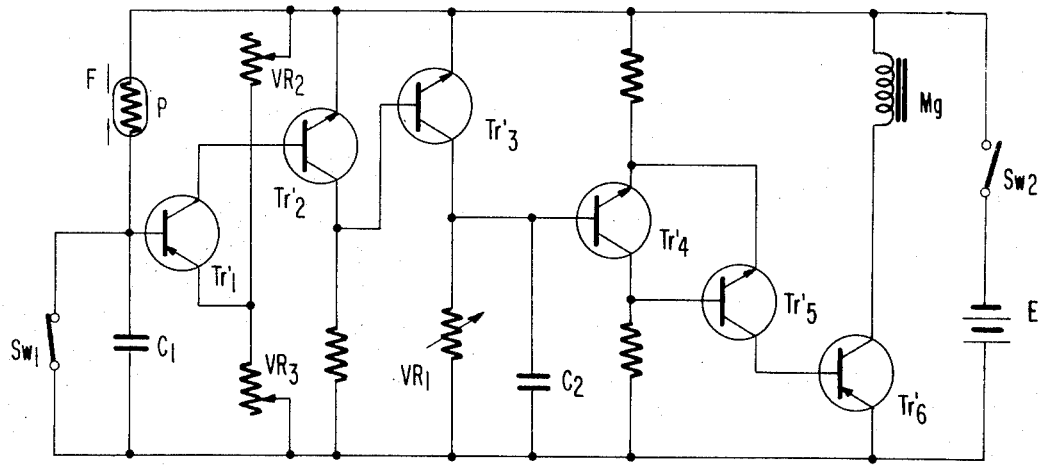

FIG. 3 illustrates a schematic circuit diagram of another example of an electronic shutter circuit embodying the present invention. The difference from the embodiment shown in FIG. 2 and that of FIG. 3 is such that the emitter of the transistor $Tr_1$ is connected to the connecting point of the variable resistors $VR_2$ and $VR_3$, to which voltages divided by these two variable resistors are applied. Also, the variable resistors $VR_2$ and $VR_3$ are set to certain values respectively responding to the diaphragm opening of the camera lens and the film sensitivity by known linking means not shown in figure. The relationship among the transistors $Tr'_1$, $Tr'_2$ and $Tr'_3$ is such that they form a switching circuit, wherein the transistor $Tr'_3$ is in conductive state when the transistors $Tr'_1$ and $Tr'_2$ are non-conductive, which circuit becomes completely in the opposite state of the transistors when reversed. The capacitor $C_2$ is connected in parallel with the variable resistor $VR_1$.

In such a circuit construction, as in the case of FIG. 2, when the power switch $SW_2$ is closed and the transistor $Tr'_3$ becomes conductive, the voltage across both ends of the variable resistor $VR_1$, as well as across the capacitor $C_2$, increase and the voltage between the base and the emitter of the transistor $Tr'_4$ drops, making the transistor $Tr'_4$ non-conductive and hence, making the transistors $Tr_5$ and $Tr_6$ conductive. Then power is fed to the electromagnet Mg through the transistor $Tr'_6$. After the opening of the count starting switch $SW_1$ and the lapse of a predetermined time, the capacitor $C_1$ is charged to the predetermined value corresponding to the voltage divided by the variable resistors $VR_2$ and $VR_3$, and then the on-off state of the switching circuit comprising the transistors $Tr'_1$, $Tr'_2$ and $Tr'_3$ is reversed and the transistor $Tr'_3$ becomes non-conductive. Whereupon, the electric charge stored in the capacitor $C_2$ is discharged through the variable resistor $VR_1$ and, after the lapse of time corresponding to the resistance of said variable resistor $VR_1$ and the electrostatic capacitance of the capacitor $C_2$, the capacitor $C_2$ is discharged down to the predetermined level; and the switching circuit comprising the transistors $Tr'_4$ and $Tr'_5$ is reversed and the transistor $Tr'_6$ becomes non-conductive to cut off the supply of current to the electromagnet Mg, and triggers the closing operation of the shutter.

Figure 4:
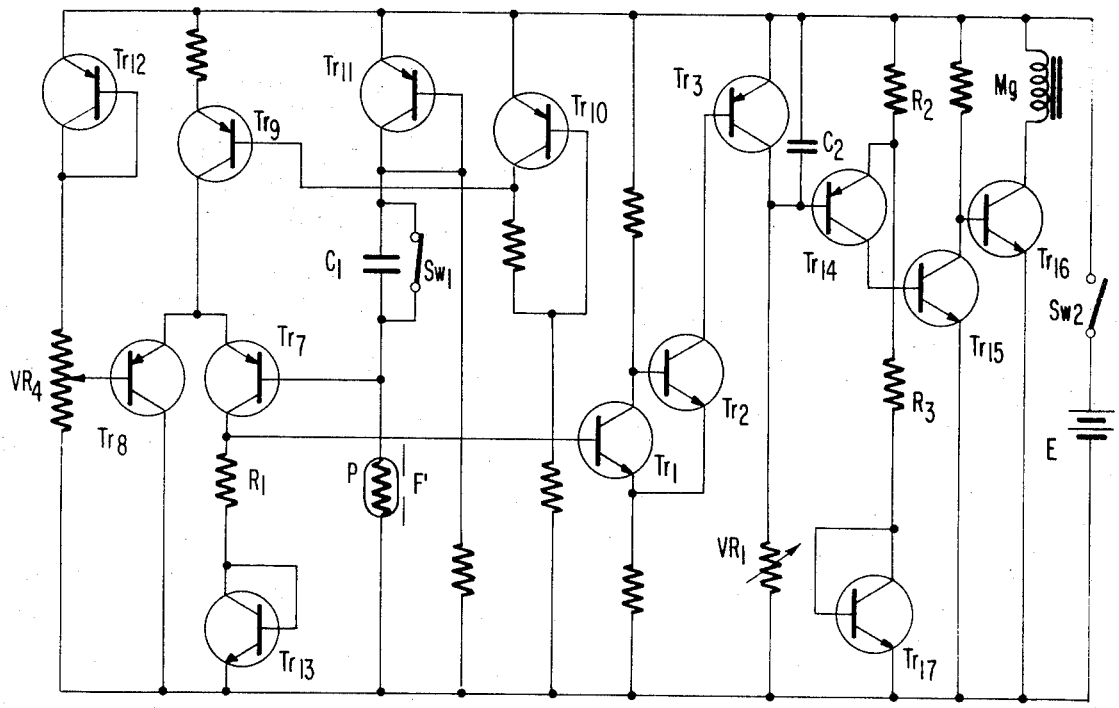

FIG. 4 illustrates a schematic circuit diagram of a practical example of an electronic shutter circuit embodying the present invention, which is a circuit made by adding a thermal error compensation circuit and an electric voltage error compensation circuit and further inserting a differential amplifier circuit between a first delay circuit containing the photoconductive element and the transistor switching circuit, to the circuit illustrated in FIG. 2, in order to increase the detecting accuracy and stability of operation. In FIG. 4, $Tr_7$ and $Tr_8$ are transistors constituting a differential amplifier circuit. A transistor $Tr_9$, to whose collector the emitters of the transistors $Tr_7$ and $Tr_8$ are connected, forms a constant current circuit to keep the total emitter current of said differential amplifier circuit constant and to maintain the output of said differential amplifier circuit at a constant level, together with a transistor $Tr_{10}$ the collector of which is connected to the base of said transistor $Tr_9$. $VR_4$ is a variable resistor to provide bias voltage to the base of transistor $Tr_8$, the base of which is connected to the rotor terminal of the variable resistor $VR_4$, and the resistance of it is set depending on, for instance, the film sensitivity. The filter F' is constituted to control the incident light of the photoconductive element P depending on the value of camera-lens-diaphragm opening. $Tr_{11}$ and $Tr_{12}$ are transistors to increase the number of adjusting steps for the variable resistor $VR_4$ responding to the film sensitivity, by raising the base voltage of the transistors $Tr_7$ and $Tr_8$. A transistor $Tr_{13}$, the collector of which is connected to the collector of the transistor $Tr_7$ via the output resistor $R_1$, is for thermal compensation by the transistor $Tr_1$ which constitutes a switching circuit with the transistor $Tr_2$. $Tr_{14}$ is a transistor which constitutes, together with transistors $Tr_{15}$ and $Tr_{16}$ a switching circuit, providing the function same as the circuit comprising the transistors $Tr'_1$, $Tr'_2$ and $Tr'_3$ in FIG. 3. Transistor $Tr_{17}$ connected in a series with the voltage dividing resistors $R_2$ and $R_3$ is a thermal compensation transistor for said transistor $Tr_{14}$. An electromagnet Mg is connected in the collector circuit of said transistor $Tr_{16}$.

In such a circuit construction, when the power switch $SW_2$ is closed at the start of the shutter-opening operation, the capacitor $C_1$ is short-circuited by the count starting switch $SW_1$, and the collector current of the transistor $Tr_7$ is very small. Therefore, the transistor $Tr_1$ is non-conductive state and, like the case of the circuit illustrated in FIG. 2, the capacitor $C_2$ is only charged slightly, the transistors $Tr_{14}$ and $Tr_{15}$ are in the non-conductive state and the transistor $Tr_{16}$ is in the conductive state. Accordingly, the electromagnet Mg is excited and the holding members of the shutter-closing mechanism are held in their holding positions. By the opening operation of the shutter, the count starting switch $SW_1$ is opened and the capacitor $C_1$ is charged through the photoconductive element P and, after the lapse of time equal to the proper exposure time determined by the filter F', the film sensitivity and the camera-lens-diaphragm opening, the capacitor $C_1$ is charged to the predetermined level. Then, the collector current of the transistor $Tr_7$ increases suddenly and the output voltage increases, making the transistor $Tr_1$ conductive. Therefore, the transistor $Tr_2$ is cut off and the capacitor $C_2$ is charged through the variable resistor VR and when the charging voltage reaches the predetermined value, the switching circuit comprising the transistors $Tr_{14}$, $Tr_{15}$ and $Tr_{16}$ is reversed and the supply of power to the electromagnet Mg is cut off, whereupon the shutter-closing operation starts.

Now, the function of the foregoing embodiment against the fluctuation of voltage and temperature will be explained. The delay time of the second delay circuit comprising the variable resistor $VR_1$ and the capacitor $C_2$, in other words, the time required after the transistor $Tr_3$ becomes non-conductive state from conductive state until the transistor $Tr_{14}$ becomes conductive state from non-conductive state, is defined as $t_d$; this time $t_d$ can be considered as the time required for the charged voltage of the capacitor $C_2$ to become equal to the total voltage across both ends of the resistor $R_2$ and the base-emitter voltage $V_{BE14}$ of the transistor $Tr_{14}$. When the collector current of the transistor $Tr_{14}$ in the conductive state is set around $1\mu A$ and the collector current of the transistor $Tr_{17}$ is set around $50\mu A$, the influence of the collector current of said transistor $Tr_{14}$ is negligibly small, and the following equation can be established:

$$V_{BE14} + \frac{r_2}{r_2+r_3}(E-V_{BE17}) = E\left(1 - e^{-\frac{t_d}{C_2 r_v}}\right) \quad (1)$$

wherein
$r_2$ = resistance of the resistor $R_2$
$r_3$ = resistance of the resistor $R_3$
$E$ = power supply voltage
$V_{BE17}$ = base-emitter voltage of the transistor $Tr_{17}$
$C_2$ = electrostatic capacitance of the capacitor $C_2$
$r_v$ = resistance of the variable resistor $VR_1$
When this equation is converted to obtain $t_d$, it becomes $$Ee^{-\frac{t_d}{C_2 r_v}} \frac{r_3}{r_2+r_3} E - V_{BE14} + \frac{r_2}{r_2+r_3} V_{BE17} \quad (2)$$

and $t_d$ is expressed by $$t_d = C_2 r_v \log \frac{E}{\left(\frac{r_3}{r_2+r_3} E - V_{BE14} + \frac{r_3}{r_2+r_3} V_{BE17}\right)} \quad (3)$$

If we set the circuit constant to satisfy the following equation:

$$V_{BE14} = \frac{r_2}{r_2+r_3} V_{BE17} \quad (4)$$

the equation (1) becomes $$t_d = C_2 r_v \log \frac{r_2+r_3}{r_3}$$

which means that the delay time $t_d$ does not include any parameter of the power supply voltage and become free from fluctuation of the power supply voltage.

Now, consider the influence of the fluctuation in the characteristics of transistors by the ambient temperature. As aforementioned, when the collector current of the transistor $Tr_{14}$ is set around $1\mu A$ and the collector current of the transistor $Tr_{17}$ is set around $50\mu A$, the following value $V_x$ in the equation (3) changes normally at a rate of about $-0.3$ mV against the temperature change of $1°$ C, due to the difference of the operating points of these transistors.

$$\left(\frac{r_2}{r_2+r_3} V_{BE17} - V_{BE14}\right) = V_x \quad (6)$$

Therefore, within the normal ambient temperature range of $50°$ C from $-20°$ C to $+30°$ C for normal camera operating conditions, said value $V_x$ changes about 15mV. However, since the value of $(r_3/r_2 + r_3)E$ in the Equation (1) is in the order of volts, said change of about 15mV is negligible, and by the circuit construction as shown in FIG. 4, the delay time of the second delay circuit obtains stable performance characteristics against the fluctuation of both the supply voltage and the ambient temperature.

On the other hand, in the differential amplifier circuit, the stable performance characteristics are always maintained by the control of the emitter current which is regulated by the constant voltate circuit comprising the transistors $Tr_9$ and $Tr_{10}$, and the change in the characteristics of the switching transistor $Tr_1$, connected to the output stage of said differential amplifier circuit, is off-set by that of the transistor $Tr_{13}$ and thus stable switching performance characteristics are provided.

The embodiment of the present invention is not limited to the examples mentioned above, but is provides the same effect even if the positions of the photoconductive element P and the variable resistor $VR_1$ are exchanged with each other in the circuit illustrated in FIG. 2. Also in the circuit illustrated in FIG. 4, it is possible to control the start of charging to the capacitor $C_1$, which is connected in series with the photoconductive element P, by controlling with the switching circuit connected as a next stage to the second delay circuit, when the electromagnet Mg is connected to the output of the switching circuit which is controlled by the first delay circuit including the photoconductive element P. Also, the type of the light measuring element is not limited to the photoconductive element, but the delay circuits and the switching circuits can be modified within a range corresponding to the objective of the present invention, and moreover, various modifications can be adopted for interlocking of the electronic circuit with the shutter-operating mechanism depending on the requirements.

As aforementioned, the present invention enables the start of the shutter-closing operation by the operation of the electromagnet after the lapse of the delay time for the exposure corresponding to the brightness of the photographic object plus the additional delay time created by the timer circuit. Therefore, it is possible to adjust the starting time difference in the light-shielding members in response to particular additional time sufficient to cover overlapping of the light-shielding members by electronic means of high accuracy in the shutter where in the two light-shielding members move in the same direction at a required time interval. Also, the additional time delay is easily controlled with high accuracy by electronic means; therefore, the error in the additional time particular to an individual camera and the error in the interlocking time between the electronic circuit and the shutter-operating mechanism can also be adjusted. Thus, an electronic shutter of high accuracy without error can be furnished to each camera, such accuracy having the significant effect of assuring the accuracy even for the shortest shutter speed.

Also, the circuit of the present invention provides an electronic shutter of high accuracy to ordinary lens shutters by eliminating the error in the control time particular to individual camera. In other words, by constituting a circuit for starting the shutter-opening operation after the lapse of predetermined short time subsequent to the opening of the count starting switch, errors among cameras as to the time required before starting switch and the time required before the shutter is actually closed after the shutter-closing signal is generated by the electronic circuit, can be corrected by adjusting the additional delay time related to the timer circuit of the present invention.

I claim:

1. An electronic shutter system for controlling the opening and closing of a camera shutter comprising:

camera shutter control means, connected to said camera shutter, for effecting the opening and closing thereof;

a first control circuit, including first means, responsive to the application of input power thereto, for generating a shutter opening signal;

a second control circuit, connected to said first control circuit, including second means, responsive to said shutter-opening signal, for applying said shutter opening signal to said shutter control means, for effecting the opening of said camera shutter, wherein said first control circuit further includes third means, coupled to said shutter control means and being responsive to the commencement of the opening motion of said camera shutter by said shutter control means, for generating a first timing signal; and wherein said second control circuit further includes fourth means, responsive to the generation of said first timing signal by said third means, for generating a second timing signal and supplying said second timing signal to said shutter control means, whereby said camera shutter will be closed by the application of said second timing signal to said shutter control means, a period of time after the opening thereof.

2. An electronic shutter system according to claim 1, wherein said shutter control means comprises an electromagnetic means connected to said shutter and wherein said third means of said first control circuit includes a photoelectric element and a first capacitor connected in series to form a first timing circuit and being responsive to the brightness of a photographic object for controlling the characteristics of said first timing signal.

3. An electronic shutter system according to claim 2, wherein said fourth means of said second control circuit comprises a variable resistor and a second capacitor connected together to form a second timing circuit, the charging of said second capacitor being controlled by said first timing signal, and wherein said second control circuit includes an output transistor switching circuit, the output of which is connected to said electromagnetic means, responsive to the charge accumulation on said second capacitor, for effecting the energization and de-energization of said electromagnetic means, whereby said shutter will be opened and closed thereby.

4. An electronic shutter system according to claim 2, wherein said fourth means of said second control circuit comprises a variable resistor and a second capacitor connected together to form a second timing signal, the discharging of said second capacitor being controlled by said first timing signal, and wherein said second control circuit includes an output transistor switching circuit, the output of which is connected to said electromagnetic means, responsive to the charge accumulation on said second capacitor, for effecting the energization and de-energization of said electromagnetic means, whereby said shutter will be opened and closed thereby.

5. An electronic shutter system according to claim 2, wherein said third means of said first control circuit further includes a differential amplifier connected to said photoelectric element and coupled to said second control circuit.

6. An electronic shutter system according to claim 5, wherein said output transistor switching circuit further includes a compensation transistor circuit connected thereto for effectively compensating said output switching circuit against temperature variations therein.

7. An electronic switching system according to claim 5, wherein said differential amplifier includes a compensation transistor circuit for protecting said differential amplifier against the dependency thereof on variations in the source voltage applied thereto.

8. An electronic shutter system according to claim 1, wherein said first means of said first control circuit includes a first transistor switching circuit connected between a source of input power and said second control circuit for delivering said shutter-opening signal thereto.

9. An electronic shutter system according to claim 8, wherein said third means includes a photoelectric element and a first capacitor switchably connected to said source of input power and to said first transistor switching circuit for controlling the operation thereof in response to the charge accumulation on said first capacitor in accordance with the impedance characteristics of said photoelectric element due to the light impinging thereon from a photographic object.

10. An electronic shutter system according to claim 9, wherein said first circuit further includes a first switch connected across said first capacitor for short-circuiting said first capacitor during the generation of said shutter-opening signal.

11. An electronic shutter system according to claim 1, wherein said second means comprises a second transistor switching circuit connected to said first control circuit and said shutter control means for applying said shutter-opening signal thereto.

12. An electronic shutter system according to claim 11, wherein said fourth means includes a variable resistor and a second capacitor switchably connected to a source of input power and to said second transistor switching circuit for controlling the operation thereof in response to the charge accumulation on said second capacitor.

13. An electronic shutter system according to claim 12, wherein said second control circuit further includes a second switch connected to said second capacitor, for maintaining said second capacitor in a predetermined state of charge during the generation of said shutter opening signal.

14. An electronic shutter system according to claim 13, wherein said second switch comprises a transistor switch, the control electrode of which is connected to said first control circuit, so as to charge and discharge said second capacitor in response to the output of said first control circuit.

15. An electronic shutter system according to claim 8, wherein said second means comprises a second transistor switching circuit connected to said first control circuit and said shutter control means for applying said shutter-opening signal thereto.

16. An electronic shutter system according to claim 15 wherein said fourth means includes a variable resistor and a second capacitor switchably connected to a source of input power and to said second transistor switching circuit for controlling the operation thereof in response to the charge accumulation on said second capacitor.

17. An electronic shutter system according to claim 16, wherein said second control circuit further includes a second switch connected to said second capacitor, for maintaining said second capacitor in a predetermined state of charge during the generation of said shutter-opening signal.

18. An electronic shutter system according to claim 17, wherein said second switch comprises a transistor switch, connected to said first transistor switching circuit, for controlling the charging and discharging of said second capacitor in response to the output thereof.

19. An electronic shutter system according to claim 18, wherein said third means includes a photoelectric element and a first capacitor switchably connected to said source of input power and to said first transistor switching circuit for controlling the operation thereof in response to the charge accumulation on said first capacitor in accordance with the impedance characteristics of said photoelectric element due to the light impinging thereon from a photographic object.

20. An electronic shutter system according to claim 19, wherein said first circuit further includes a first switch connected across said first capacitor for short-circuiting said first capacitor during the generation of said shutter-opening signal.

21. An electronic shutter system according to claim 20, wherein said shutter control means comprises an electromagnetic means and an energizing transistor therefor connected together, said energizing transistor being connected to said second transistor switching circuit, so as to energize and de-energize said electromagnetic means in response to the output of said second transistor switching circuit.

22. An electronic shutter system according to claim 14, wherein said transistor switch is connected across said second capacitor so as to maintain said capacitor discharged during the generation of said shutter-opening signal.

23. An electronic shutter system according to claim 14, wherein said transistor switch is connected in series with said second capacitor, so as to maintain said second capacitor charged during the generation of said shutter-opening signal.

24. An electronic shutter system according to claim 23, wherein said first transistor switching circuit includes a first and a second transistor connected in cascade, the emitter electrode of said first transistor being connected to a voltage divider network, the impedance of which is controllably linked to the diaphragm opening of the lens of said camera and a film sensitivity setting therefor.

25. An electronic shutter system according to claim 9, wherein said first control circuit further includes a differential amplifier circuit connected between said photoelectric element and said first transistor switching circuit, so as to increase the stability of operation of said circuit.

26. An electronic shutter system according to claim 25, further including a constant current circuit connected between said source of supply voltage and said differential amplifier circuit.

27. An electronic shutter system according to claim 26, wherein said constant current circuit comprises a pair of cascaded transistors, a first of which is connected across said source of supply voltage and the second of which is connected to said differential amplifier.

28. An electronic shutter system according to claim 26, further including a film sensitivity setting circuit comprising first and second transistors, a first of which is connected between said power source and said first capacitor and a second of which is connected between said power source and a first input of said differential amplifier.

29. An electronic shutter system according to claim 28, further including a variable resistor connected between said second transistor of said film sensitivity setting circuit and said first input of said differential amplifier, whereby the first input applied to said differential amplifier is adjusted in dependence of said film sensitivity.

30. An electronic shutter system according to claim 29, wherein the second input of said differential amplifier is connected to said first capacitor and said photoelectric element.

31. An electronic shutter system according to claim 30, further including a first thermal compensation transistor circuit connected to the input of said first transistor switching circuit for providing thermal compensation therefor.

32. An electronic shutter system according to claim 31, wherein said second means comprises a second transistor switching circuit connected to said first control circuit and said shutter control means for applying said shutter opening signal thereto, and further includes a second thermal compensation transistor circuit connected to said second transistor switching circuit for providing thermal compensation therefor.

* * * * *